Sept. 29, 1942.    L. N. WALTER    2,297,592
CAN OPENER
Filed Oct. 20, 1941

LEO N. WALTER
INVENTOR.
BY Leon T. Hooper
ATTORNEY.

Patented Sept. 29, 1942

2,297,592

UNITED STATES PATENT OFFICE 2,297,592

CAN OPENER

Leo N. Walter, East Chicago, Ind.

Application October 20, 1941, Serial No. 415,790

4 Claims. (Cl. 30—16)

This invention relates to an improved can opener and has for one of its principal objects of advantage and importance the production of a sanitary, sturdy and practically indestructible device.

Another and further object of advantage and importance is the provision of means for cutting a substantially V-shaped pouring opening having clean-cut smooth edges.

A further object of advantage and importance is the provision of means for turning the displaced V-shaped portion radially inwardly. The V-shaped pouring opening thus provided is substantially drip-proof.

Various can opening devices have been introduced to the public. These openers have been found unsatisfactory because milk and other relatively quick drying fluids adhere and coagulate on the rough cut edge of the openings made. This action interferes with pouring and in some cases, the opening becomes entirely blocked. Moreover, the irregular rough edge with its attendant dried milk is unsightly and unsanitary.

The improved device of this invention overcomes the above recited objections and provides a pouring opening having clean-cut edges upon which only a minimum quantity of milk or other fluid may adhere.

A further object of advantage and importance resides in the provision of means for using a resilient blade on an insert for cutting the can. The insert with its resilient blade may be employed independently or in conjunction with the balance of the improved device of this invention.

An additional object of advantage and importance resides in the provision of means for using either part of the improved device of this invention and also opening various sized cans or containers without making any preparatory adjustments in the device.

Additional objects of advantage and importance will become apparent as the following detailed description progresses. Reference being had to the accompanying drawing, wherein Fig. 1 is a top plan view of a can opener which embodies the invention.

Figure 1:
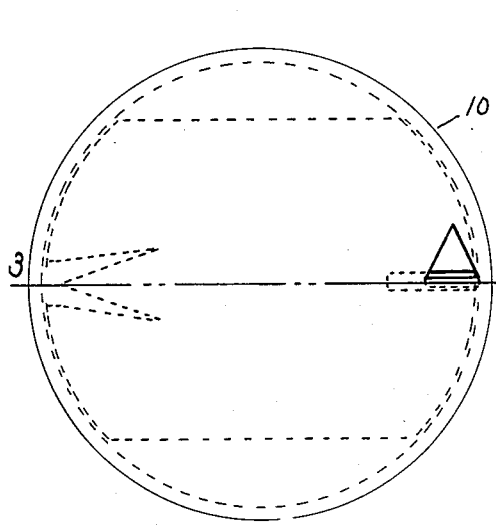
Figure 2:
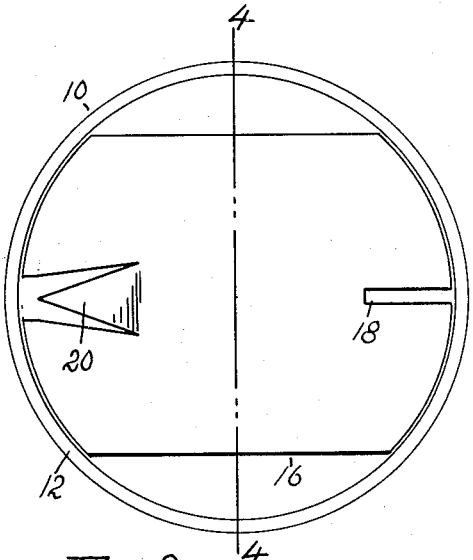
Fig. 2 is a bottom plan view thereof.

The reference numeral 10 indicates generally the body of the improved device of this invention. In the preferred embodiment of the invention the body 10 is substantially cup shaped. The edges 12 of the body 10 are formed at substantially right angles to the remainder of the part. The entire body is preferably circular in plan.

Figure 3:
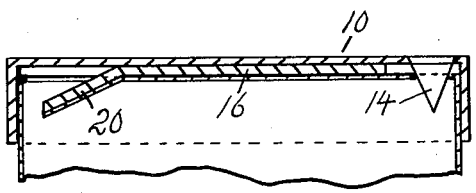
Fig. 3 is a section taken on line 3—3 of Fig. 1.
Figure 4:
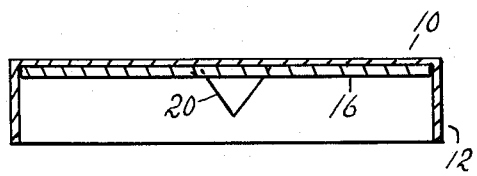
Fig. 4 is a section taken on line 4—4 of Fig. 2.

Projecting donwwardly from the inner flat surface of the body 10 is a triangularly shaped perforating member 14. The member 14 may be a displaced portion of the flat surface of the body 10 as is clearly shown in the drawing. One triangular edge of the perforationg member 14 faces the interior surface of the edge 12 and the opposite triangular edge thereof faces toward the center of the body, as is best shown in Fig. 3. The radially disposed perforating member also functions as a locating stop for an insert 16, hereinafter more specifically described.

Removably positioned within the cup shaped body 10 is an insert 16. The insert 16 is preferably flat and conforms in shape to the interior of the body 10.

Formed in the insert 16 and extending radially from the peripheral edge to a point nearer the center thereof is a perforating member receiving slot 18. The slot 18 in conjunction with the perforating member 14 prevents independent rotation of the associated insert 16 and body 10.

Figure 5:
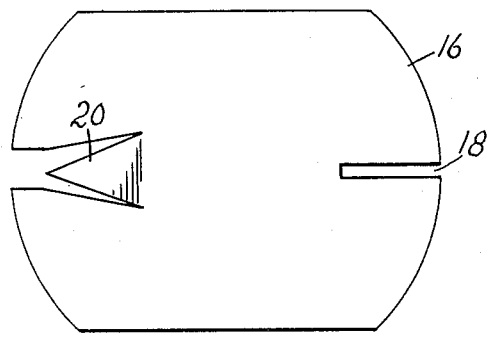
Fig. 5 is a plan view of the insert member.

Formed in the opposed side of the insert 16 and extending radially toward the peripheral edge thereof is a V-shaped cutting member 20. The V-shaped cutting member 20 is preferably formed of a displaced portion of the insert 16 as is best shown in Fig. 5. The cutting member 20 projects downwardly at a slight angle from the bottom surface of the insert 16, with the pointed end closely adjacent the edge of the insert.

In operation the insert 16 may be positioned within the cup shaped member 10 with the perforating member 14 in registry with the slot 18. The assembled unit is then positioned over the end of a can to be opened. As a downward pressure is applied to the unit the perforating member 14 is forced through the can head and the flat surface at the point of the cutting member 20 is brought into contact with the can. Continued pressure forces the cutting member downwardly. As the member 20 moves downwardly the edges thereof engage and cut a V-shaped pouring opening in the can head. The cut out portion of metal is depressed and forced slightly inwardly. Accordingly it will be seen that a clean cut unobstructed pouring opening is provided.

Moreover, the pouring opening thus produced has no ragged edges upon which milk or the like may adhere and coagulate. Additionally, the opening being V-shaped is practically drip proof. Consequently a high degree of sanitation is obtained.

The cup shaped body 10 may also be used as a cover for an unused opened can. With the perforating member 14 in the vent hole the improvised cover is substantially sealed.

It will be apparent from the foregoing that herein is provided a sanitary and efficient can opener and cover which may be universally used. Moreover, the parts may be readily separated for cleaning or independent use.

It will also be apparent to those skilled in the art to which the device appertains that numerous changes in construction and design may be made without departing from the scope or spirit of this invention. Accordingly, the patent granted hereon is not to be limited to the precise embodiments shown or in any other manner except as is necessitated by the terminology of the appended claims when given the range of equivalents to which they may be entitled.

I claim as my invention:

1. In a can opener, a substantially cup-shaped body, a triangularly shaped perforating member, said member being located adjacent the inner peripheral wall of said body and extending radially toward the center thereof, an insert removably positioned within said body, the edges and one surface of said insert being formed to engage the interior of said body, and a substantially V-shaped cutting blade disposed tangentially of said insert.

2. In a can opener, a circular member, a locating and perforating member positioned adjacent the edge of said circular member, a plate removably associated with said circular member, a locating member receiving slot formed near the circumferential edge of said plate, a V-shaped cutting member formed on the opposed side of said plate near the circumferential edge thereof, said cutting member being formed to provide means for turning the cut portion of a can head downwardly and toward its center.

3. In a can opener, a body adapted to be positioned upon the end of a can, means carried by said body for perforating a vent hole in said can end closely adjacent one edge thereof, an insert removably positioned within said body, said insert being formed to provide means for cutting a V-shaped pouring opening near the opposite edge of said can end, and means for depressing the cut-out portion downwardly and inwardly.

4. In a can opener, a body comprising a circular member having downwardly turned edges, a single perforating member projecting downwardly from the bottom surface of said circular member, said member being disposed to perforate a radially extending slot in a can head, and an insert removably positioned within said body, said insert being provided with means for making a pouring opening in a can head, said body being adapted to be utilized as a sanitary cover for an opened can.

LEO N. WALTER.